Jan. 1, 1963 R. V. HELLER 3,071,295
BULK FEEDING APPARATUS
Filed April 18, 1958 6 Sheets-Sheet 1

INVENTOR.
RICHARD V. HELLER
BY
ATTORNEYS

Jan. 1, 1963 R. V. HELLER 3,071,295
BULK FEEDING APPARATUS
Filed April 18, 1958 6 Sheets-Sheet 3

INVENTOR.
RICHARD V. HELLER
BY
ATTORNEYS

Jan. 1, 1963     R. V. HELLER     3,071,295
BULK FEEDING APPARATUS Filed April 18, 1958             6 Sheets-Sheet 6

INVENTOR.
RICHARD V. HELLER
BY
ATTORNEYS

United States Patent Office 3,071,295
Patented Jan. 1, 1963

3,071,295
BULK FEEDING APPARATUS
Richard V. Heller, Box 312, Kerhonkson, N.Y.
Filed Apr. 18, 1958, Ser. No. 734,069
6 Claims. (Cl. 222—342)

This invention relates to feeding apparatus in general and more particularly to feeding apparatus for delivering a smooth flow of dry or semi-dry material, comprising small particles, at a controlled rate with the material being received by the apparatus from a discharge opening at the bottom of a vertically walled supply hopper.

Cement, grains, charcoal, and other fungibles as well as many mixtures of dry or semi-dry materials are often stored in bulk in a larger hopper or else supplied in bulk to a hopper. From the hopper, these materials are fed to automatic packaging apparatus which places a predetermined amount of material in a container. It is essential that the material flows through the packaging apparatus at a controlled rate. To this end a bulk feeding apparatus should be included for supplying material at a uniform controllable rate.

The device of the instant invention operates on conveying principles utilizing a rotating conveying tube. In bulk feeding apparatus of this type it is well recognized that the rate of flow of material through the tube increases as the rotational speed increases and also as the downward incline between the tube receiving and discharge ends increases. As between the two speed controlling factors the tube inclination has the greatest effect upon the smoothness of flow. That is, as the tube inclination is increased, thereby increasing the flow rate the smoothness of flow decreases.

Smoothness of flow may be maintained substantially uniform for a given tube inclination, as the rotational speed of the tube is increased. However, there is an optimum speed for a given slope. At speeds higher than optimum the material will tend to adhere to the inner wall of the tube. As the speed increases above the optimum more of the material will tend to adhere to the tube wall, starting at the hopper, or receiving end where the largest mass of material is concentrated, and less will issue forth at the discharge end until delivery completely ceases. The optimum rotational speed is effected not only by the tube inclination, but also by the coefficient of friction between the tube's inner surface and the material being fed.

In order to increase the output of the rotating tube and still maintain a smooth flow of material, one embodiment of the instant invention includes a scraper means which separates the material from the tube wall. The scraper means comprises one or more longitudinally extending blades positioned internally of the rotating tube and lightly biased against the inner wall thereof.

In another embodiment of this invention the rotating tube is comprised of a moving continuous flexible belt forming a smoothed-walled non cylindrical tube through which the material is conveyed. The belt is supported in a manner such that the tube formed thereby possesses a cross-section symmetrical about a vertical axis and resembles a belt passed over two different size sheaves whose centers are spaced apart and positioned on the vertical axis with the smaller diameter sheave above the larger diameter sheave.

With the latter construction high speed conveying of dry materials is readily achieved without utilizing a scraping means since dry material will not stick to the tube surface beyond a given height. Thus the friction between the scraper blades and tube wall has been eliminated. Further, the elongated shape provides a large opening for the introduction of material from the hopper to the rotating conveying tube.

With the foregoing arrangements rotating conveying tubes will deliver highly uniform amounts of material. Furthermore, the amount of material by weight, delivered for a given number of tube revolutions will be much greater than the amount of material formerly delivered by this same number of tube revolutions. This also results in the lessening of the operating power requirements of the bulk feeder.

Some materials, such as corn flakes and nails, either because of their lightness in weight, large surface area, or slope tend to bridge and stick in the supply hopper. Bridging is caused by material overlapping the edges of the supply hopper exit and being held there by the pressure of material from behind. This effectively decreases the size of the exit opening and produces an erratic or intermittent rather than a smooth flow of material from the conveyor tube.

One embodiment of my invention is specifically directed toward an arrangement for preventing the aforesaid bridging. This embodiment includes a supply hopper of uniform elliptical cross-section having a circular exit and a rotating baffle plate assembly positioned at the exit. The baffle plate assembly comprises two spoked plates which are angularly adjustable with respect to one another so that the size of the baffle openings may be adjusted as desired to accommodate different materials. With this arrangement a fairly equal, or average number of parts are released from each of the baffle openings and these parts, after passing through the receiving hopper and conveyor tube are delivered in a smooth flow which is a high percentage of the capacity of a bulk feeder operating without a rotating baffle assembly.

Accordingly, a primary object of the instant invention is to provide a bulk feeding apparatus that will deliver controlled amounts of material at a uniform flow rate which at a minimum comprises a single file of discrete particles to a maximum approaching the full flow vertically downward from an opening in the bottom of a vertically walled supply hopper.

Another object is to provide a scraper means for a bulk feeding apparatus which includes a rotatable tube with the scraper means being effective to permit speeds of revolution for the tube above the former optimum speed of revolution at which the flow rate began to decrease as tube speed increased.

Still another object is to provide a bulk feeding apparatus having a rotating tube comprised of a continuous belt guided over a path symmetrical about a vertical axis and having a curve of larger radius at the bottom and a curve of smaller radius at the top.

A further object is to provide a bulk feeding mechanism including a rotatable feeding tube whose rotational speed and angle of inclination are selectively adjustable.

A still further object is to provide a bulk feeding device including means to prevent bridging of the material being fed.

These as well as other objects of the instant invention shall become apparent after reading the following description of the accompanying drawings in which:

FIGURE 24 is a side elevation, partially sectioned, of a feeding device including means to prevent bridging of the conveyed material between the supply and receiving hoppers.

FIGURE 25 is a section taken through line 25—25 of FIGURE 24 looking in the direction of arrows 25—25.

FIGURE 26a is a section taken through line 26a—26a of FIGURE 26 looking in the direction of arrows 26a—26a.

Referring more particularly to FIGURES 1–4, dry or semi-dry material 30 comprising relatively small parts or particles is stored in, or fed to, supply hopper 31 whose converging walls are generally vertical disposed to form a rectangular opening 36 at the bottom of supply hopper 31. The lower ends of the supply hopper walls are entered through rectangular opening 35 into receiving hopper chute 37 which provides a gradual transition from the rectangular shape of supply hopper opening 36 to the round discharge opening of receiving hopper spout 38. Receiving hopper chute 37 is secured to spout 38 and is movable therewith.

Figure 1:
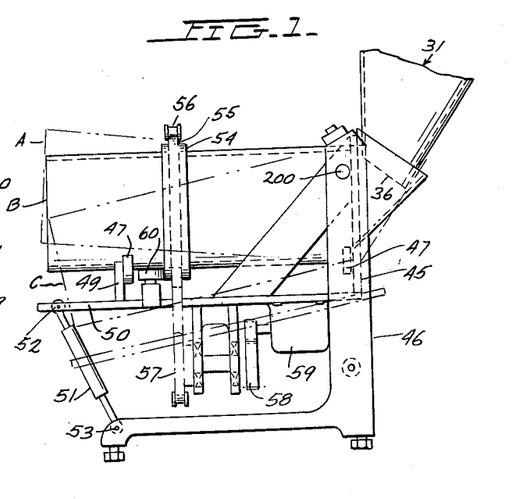
FIGURE 1 is a side elevation of a bulk feeding apparatus constructed in accordance with the principle of the instant invention.
Figure 4:
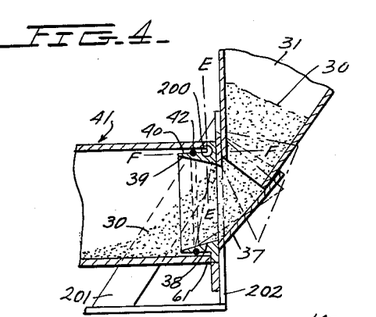
FIGURE 4 is a fragmentary view, in cross-section, of the bulk feeding apparatus of FIGURE 1.

Spout 38 is an annular member having converging walls 39, 40 which form a wedge outer wall 40 being parallel to the longitudinal axis. The converging ends of walls 39, 40 are entered into cylindrical conveyor tube 41 to fit more or less loosely with the inner diameter thereof. O-ring gasket 42 or other sealing means may be secured to the outer wall 40 of spout 38 to prevent the leakage of fine particles from the hopper end of tube 41.

Figure 2:
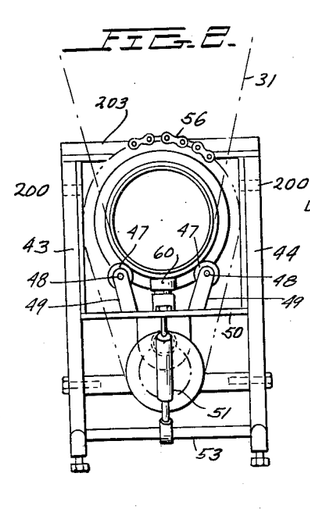
FIGURE 2 is an end view of the bulk feeding apparatus of FIGURE 1.

Conveyor tube 41 is supported at the hopper end on movable frame 45 which is pivotally supported at pivot pins 200 between vertical frame members 43, 44 of stationary frame 46. Pivot pins 200 enter braces 201, which extend diagonally upward from frame member 50, and plate 202 to which spout 38 is secured.

Bearing rollers 47 are rotatably mounted at 48 to brackets 49 extending upward from movable longitudinal frame member 50 and engage the outer surface of conveyor tube 41 to supply support therefore at the exit. Turnbuckle 51 is secured to movable frame 45 at pivot 52 and to stationary frame 46 at pivot 53. It is now readily apparent that adjustment of turnbuckle 51 will change the angle of inclination of conveyor tube 41 which is caused to pivot about fixed pivot 42 which is located at the intersection of lines E—E and F—F of FIGURE 4.

Reinforcing rib 54 having sprocket 55 formed thereon is secured to the outer surface of tube 41.

Sprocket 55 is in engagement with chain 56 which in turn, is in engagement with sprocket 57. Motor 59 supplies driving power to sprocket 57 through gearing means 58. Motor 59, gearing means 58, and sprocket 57 are all operatively secured to the bottom of movable frame member 50 and are thereby movable in unison with movable frame 45. Thus rotation of sprocket 47 with cause movement of chain 56 which drives sprocket 55 causing rotation of conveyor tube 41.

Roller bearing 60 is pivotally mounted to the longitudinal frame member 50 and operatively positioned to engage sprocket rib 55 and thereby absorb the axial thrust of conveyor tube 41 in the direction of its exit end. Axial thrust, if any occurs in the opposite direction, is absorbed by surface 61 of receiving hopper spout 38.

In FIGURE 1, A, B and C represent various positions of conveyor tube 41. Position A represents the typical minimum upward inclination at which material 30 ceases to flow through tube 41 regardless of its rotational speed. Position C represents the typical maximum downward slope, or angle of repose of material 30 in tube 41, at which material 30 will not flow when the tube is not rotating. The location of pivot axis 42 is selected to obtain the widest range of tube slopes compatible with the largest opening at the bottom of stationary supply hopper 31. The rate of output of conveyer tube 41 is controllable by varying the angle of slope. It has been found that output is dependent upon the largest possible opening 36 and the most nearly vertical are the walls of supply hopper 31.

Figure 3:
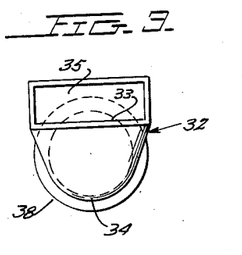
FIGURE 3 is an end view of the receiving hopper of FIGURE 1.

The effectiveness of receiving hopper 32 is dependent on the form of the back surface of chute 37 as it extends between the straight edge at 33 to the circular or spherical shape at 34. Thus material 30 flows from rectangular opening 35 at the top of receiving hopper 32, making full use of rectangular opening 36 at the bottom of supply hopper 31, to the circular opening of spout 38 fitted loosely into conveyor tube 41, thereby offering a minimum of obstruction, in a stationary passage, to the free flow of material 30 from substantially vertical to substantially horizontal motion.

The speed of rotation of conveyor tube 41 is effective in controlling the output of tube 41. That is, as the rotational speed of tube 41 increases so does the flow rate, or output. However, output will increase only up to an optimum speed for a given tube slope since material 30 tends to adhere to the inner wall of tube 41. At speeds above optimum, more and more of material 30 adheres, starting at the hopper end of tube 41 where the largest mass is concentrated, and less and less will be delivered until finally delivery completely ceases.

Figures 5, 6:
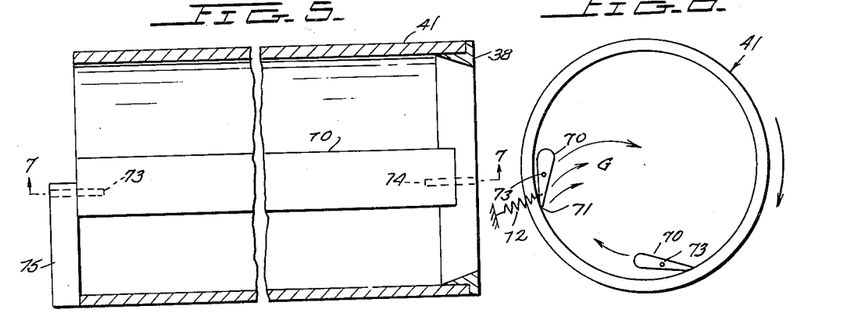
FIGURE 5 is a partially sectioned side elevation which illustrates one embodiment of a scraper means.
FIGURE 6 is an end view of the scraper means of FIGURE 5.
Figure 7:
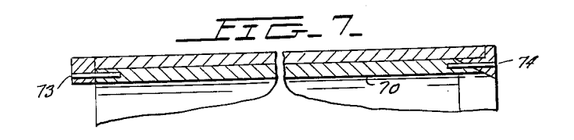
FIGURE 7 is a cross-section taken through line 7—7 of FIGURE 5 looking in a direction of arrows 7—7.

In order to alleviate this condition this invention provides a scraper means which prevents an appreciable layer of material 30 from building up on the tubes inner wall thereby increasing the maximum controllable output available. FIGURES 5-7, illustrate an embodiment of a scraper means suitable for use in relatively short conveyor tubes 41. This scraper means comprises at least one blade 70 whose working edge 71 is biased into engagement with the inner wall of tube 41 by means of tension springs 72. Since each blade 70 is relatively short it is pivotally supported only at its ends on pins 73, 74. Pin 73 is entered into a hole in bracket 75 which is secured to movable frame 45 and positioned at the discharge end of tube 41. The other pin 74 is received by a hole in spout wall 39. Springs 72 are secured to the ends of blade 70 with one spring 72 also being secured to bracket 75 and the other spring (not shown) being secured to spout 38.

With conveyor tube 41 constructed to be rotated in a clockwise direction, blades 70 are biased clockwise about their respective pins 73 so that their respective working edges 71 will be impinged upon by material 30 which will be diverted from the tube wall as indicated by arrows G. The number of scraper blades 70 is determined by the type of material and speed at which it is to be conveyed.

Blades 70 are constructed of low friction material to prevent excessive wear of tube 41. Stop members (not shown) may be included to limit the clockwise rotation of blades 70 so that they do not engage tube 41 but are positioned a minute distance from the inner surface thereof.

Figure 8:
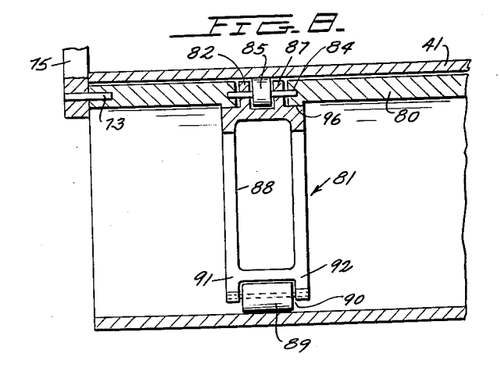
FIGURE 8 is a cross-section taken through line 8—8 of FIGURE 9 looking in a direction of arrows 8—8, and illustrating a second embodiment of a scraper means.
Figure 9:
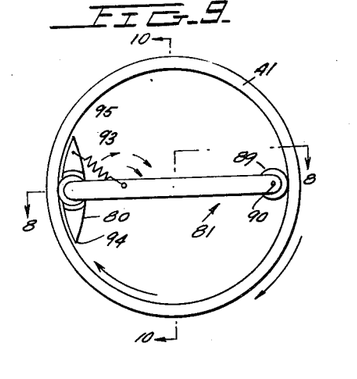
FIGURE 9 is an end view of the scraper means of FIGURE 8.
Figure 10:
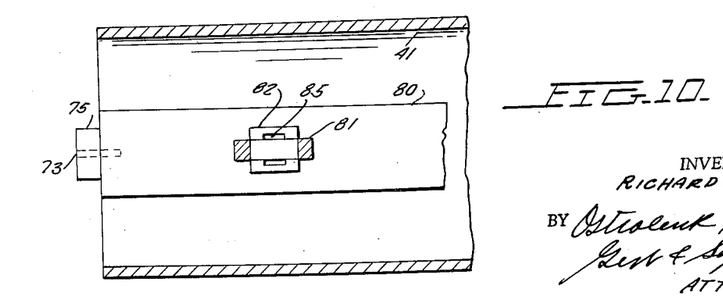
FIGURE 10 is a cross-section taken through line 10—10 of FIGURE 9 looking in the direction of arrows 10—10.

If the length of blade 80 becomes excessive intermediate support means 81 is provided (FIGURES 8-10). The pivotal end supports of blade 80 are identical to that of blade 70. However, blade 80 at one or more intermediate points along its length is provided with opening 82 each of which receive a support means 81. Pin 84 passes through one bifurcated end of support means 81 entered through opening 82 to form a rotational axis for roller 85 positioned between bifurcated sections 86, 87. The arm 88 of support means 81 is positioned along a diameter of tube 41 and carries another roller 89 on pin 90 between bifurcated sections 91, 92. The distance between extreme points on the surfaces of rollers 85 and 89 is chosen to equal or be slightly less than the inner diameter of tube 41. Tension spring 93 is secured to arm 88 and to blade 80 above pivot 73 thereby biasing blade 80 in a clockwise direction with working edge 94 thereof engaging the inner wall of tube 41.

Blade 80 is of a double convex cross-section with one of its arcuate surfaces 95 resting against support means surface 96 which is curved in the same manner as surface 95. Thus blade 80 is supported by means 81 with spring 93 maintaining working edge 94 in contact with the tube wall.

Figure 11:
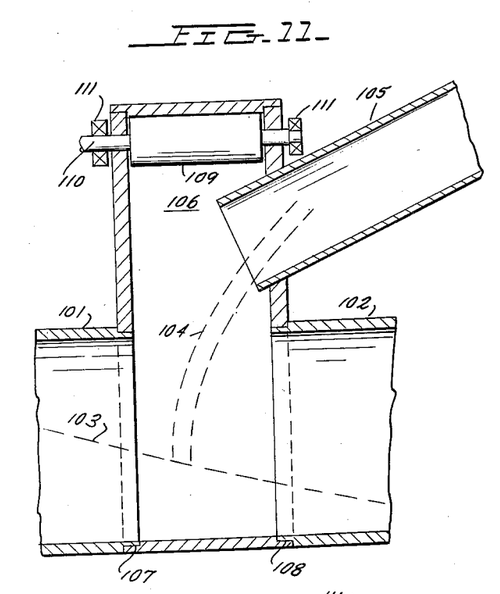
FIGURE 11 is a partially sectioned side elevation of a bulk feeding apparatus wherein material is fed from two different points.
Figure 12:
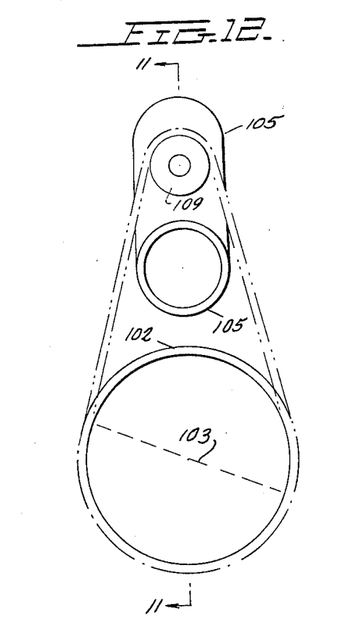
FIGURE 12 is an end view of the bulk feeding apparatus of FIGURE 11.

In some mixing operations, it is necessary to feed material into the rotating conveyor tube at several points along its length as well as at the end. In FIGURES 11 and 12, the rotatable conveyor tube is split into two sections 101 and 102 aligned along their longitudinal axes with material 103 being fed from tube section 101 to tube section 102. Another material 104 is fed from 105 tubular chute which may even be another conveyor tube or merely a means leading from another conveyor, and injected into the stream of material 103 at continuous movable belt 106. The vertical transverse axis of chute 105 is preferably in a common plane with the vertical transverse axis of conveyor tube sections 101, 102.

The ends of sections 101, 102 facing one another are notched at 107, 108 respectively to form shoulders which journal belt 106 which may be constructed of flexible steel, plastic rubber, etc. Belt 106 passes over idler wheel 109, rotatably mounted on shaft 110 in bearings 111 which are set in a fixed support (not shown). Auxiliary feed tube 105 is entered between the flights of belt 106. Belt 106 is driven at the same speed as conveyor tubes 101, 102 by engagement with shoulders 107, 108 thereof with the moving belt 106 acting in the same manner as the rotating conveyor tube in FIGURES 1-4.

Figure 13:
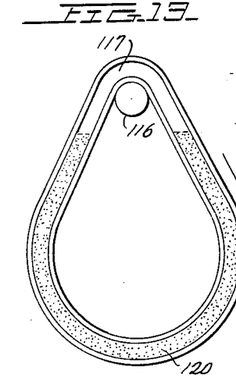
FIGURE 13 is a partially sectioned side elevation of a bulk feeding apparatus wherein the rotatable conveyer tube comprises a continuous belt.
Figure 14:
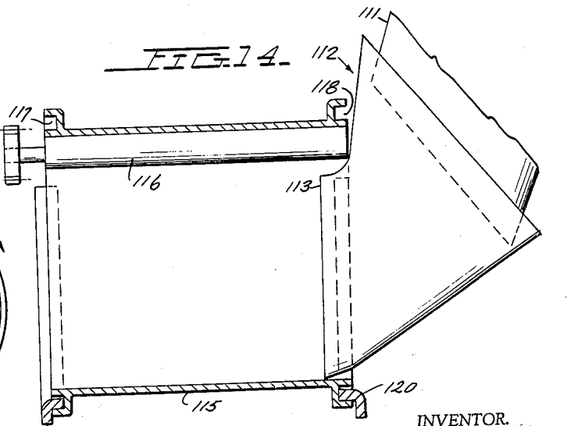
FIGURE 14 is an end view of the bulk feeding apparatus of FIGURE 13.
Figure 15:
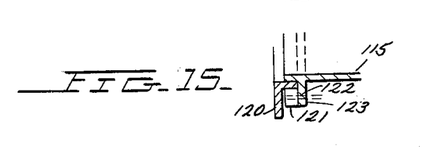
FIGURE 15 is a fragmentary view illustrating a guide means suitable for journalling a movement of the continuous belt tube of FIGURE 13.
Figure 16:
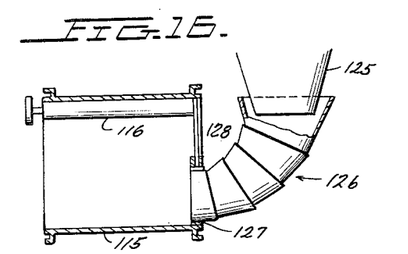
FIGURE 16 is a side elevation of a conveyor apparatus wherein the receiving hopper is rotatable.

In the embodiment of FIGURES 13-15, supply hopper 111 communicates with receiving hopper 112 whose spout 113 is entered into the supply end of rotating conveyor tube 115. Tube 115 comprises a continuous belt which is driven by wheel 116. Flexible grooves 117, 118 are molded with or secured to tube 115 at its exit and entrance ends respectively. Horseshoe shaped stationary guide members 120 are entered into grooves 117, 118 and together with drive wheel 116 define a substantially inverted horse collar shape path for continuous conveyor belt 115.

Guide members 120 are constructed of smooth, low friction, bearing material, or may be a nest for a series of rollers (not shown). In FIGURE 15, the guide grooves are illustrated as being defined by rollers 121 rotatably mounted on pin 122 to bracket 123 secured to belt 115.

This construction is particularly advantageous in high speed, high output applications when dry materials are being utilized since the material will not adhere to the tube above a certain height. The friction of the scraper against the tube is eliminated and a larger opening is also available for the initial entrance of material into the feeder.

If the material being fed has a tendency to bridge or stick in the receiving hopper, this hopper may also be rotated. FIGURES 16-19, illustrate constructions of flexible receiving hoppers. Supply hopper 125 is entered into a wide mouthed receiving hopper 126 comprising a spiraled metallic strip (FIGURE 17) bent to form an elbow. The exit end of receiving hopper 126 is in frictional engagement at 127 with belt conveyor tube 115. Thus rotation of drive wheel 116 causes rotation of flexible receiving hopper 126 with member 128 rigidly secured to movable frame 45 providing journaling for the exit end of hopper 126.

Figure 17:
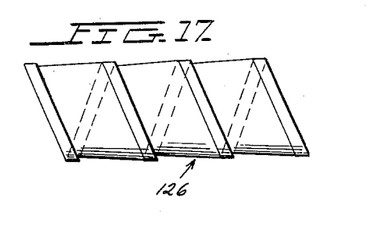
FIGURES 17 and 18 illustrate two different embodiments of a spiraled strip of spring metal which comprises the receiving hopper of FIGURE 16.
Figure 18:
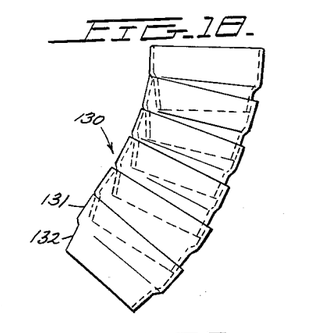
Figure 19:
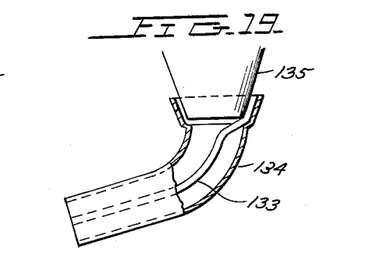
FIGURE 19 is a side elevation of a rotatable receiving hopper operated in conjunction with a scraper means.

The spiral of spring material flexes sufficiently to permit the coils to approach each other closely on the inside of the curve and widen at the outside thus making the vertical to horizontal transition in a short space. A more refined structure for spiraled strip 126 is shown in FIGURE 18 which illustrates spiraled strip 130 as comprising a strip material having a stepped portion 131 which received depression portion 132 thus achieving a lowering of friction between adjacent coils.

A scraper means 133 (FIGURE 19) similar to that illustrated in FIGURE 5 may be added to a spiraled rotatable receiving hopper 134. Scraper means 133 is suitably secured at the exit end of supply hopper 135.

Figure 20:
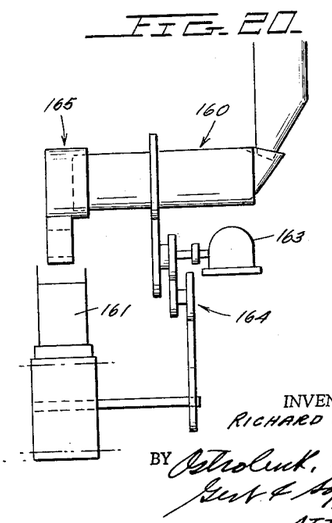
FIGURE 20 illustrates in schematic form a bulk feeding apparatus system for automatically filling containers with a predetermined amount of material.
Figure 21:
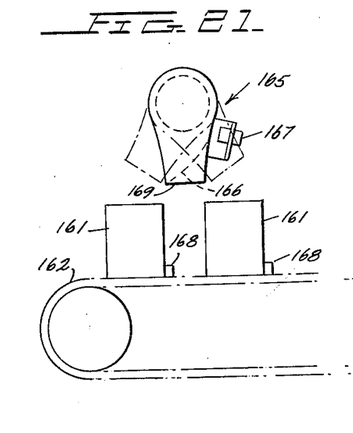
FIGURE 21 is an end view of the apparatus of FIGURE 20.

FIGURES 20 and 21, illustrate a conveyor system, including a rotating cylinder 160, for filling containers 161. Conveyor cylinder 160 and conveyor belt 162 are driven in synchronism through motor 163, gearing 164 and suitable belts. A pivotally mounted spout 165 is mounted at the discharge end of conveyor tube 160 and is operatively connected to motor 163, in a manner well known to the art, so as to have oscillatory motion imparted thereto.

A continuous supply of empty containers 161 are supplied by conveyor belt 162 with transverse slats 168 thereon establishing the correct spacing between containers 161. Material flows from discharge opening 169 of spout 165 into a container 161. Opening 165 moves with the moving container 161 to direct the material into the container. After a predetermined number of tube revolutions shutter 166, operated by solenoid or air cylinder 167, will shut and cut off the flow of material.

Spout 165 will then pivot back to its original position with discharge opening 169 over the next empty container 161, shutter 166 will open and the discharge will continue. The period during which shutter 166 remains closed is made as short as possible to allow for maximum filling time.

Figures 22, 23:
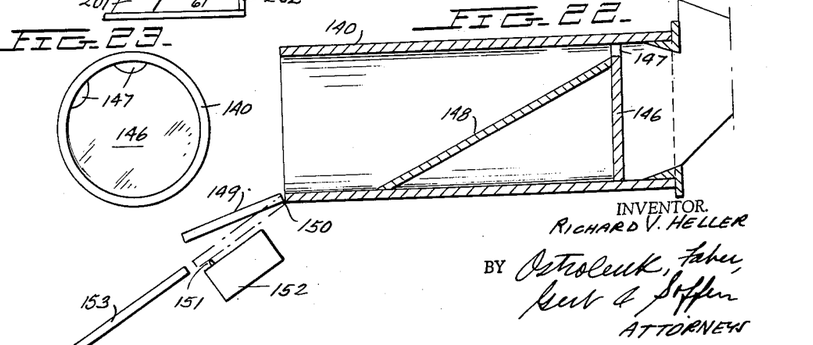
FIGURE 22 is a partially sectioned side elevation of a feeding apparatus which provides a single file of discrete articles.
FIGURE 23 is an end view of the rotatable conveyor tube of FIGURE 22.

For the feeding of relatively small parts or particles in substantially single file, suitable for insertion into a chute or other means of orderly location, rotatable conveyor tube 140 is provided near the entrance end with a disk shaped baffle 146 (FIGURES 22 and 23). Baffle 146 has one or more small openings 147 therein, the size of which depends on the size of the parts being fed. Through openings 147 will emerge a substantially steady succession of particles or parts which, proceeding through the tube, form a line which tends to distribute itself evenly and break up overlaps between individual parts. A sloping surface 148 can be provided to eliminate the shock of parts falling out of opening 147 when it is at an elevated position. This parts feeding means may be used in conjunction with tray 149 hinged at 150 which deflects when loaded with a predetermined number of particles upon deflection of tray 149, switch button 151 is depressed thereby operating electric switch 152 to stop rotation of tube 140. At the same time the particles are transferred from tray 149 to chute 153.

FIGURES 24–29 illustrate a modification of the embodiment of FIGURE 1 with means added to prevent bridging and sticking of the conveyed material between the supply and receiving hoppers. For the sake of brevity, elements in FIGURES 24–29 have been given the same reference numerals as their corresponding elements in FIGURE 1.

Figures 26, 26B:
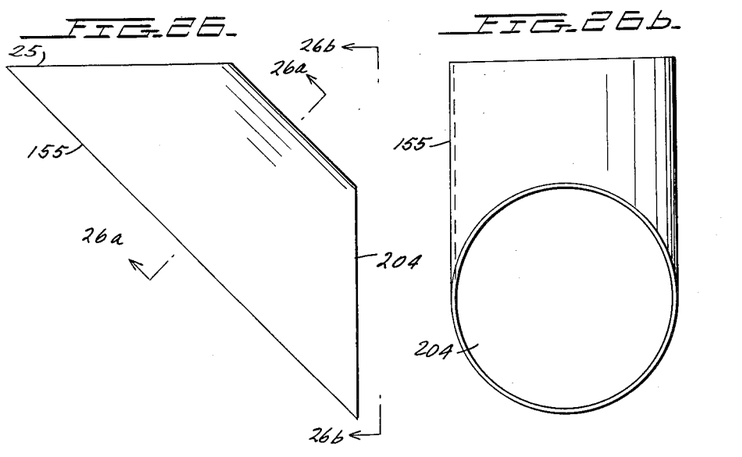
FIGURE 26 is a side elevation of the supply hopper of the embodiment of FIGURE 24.
FIGURE 26b is an end view of the supply hopper of FIGURE 26 looking in the direction of arrows 26b—26b.
Figure 26A:
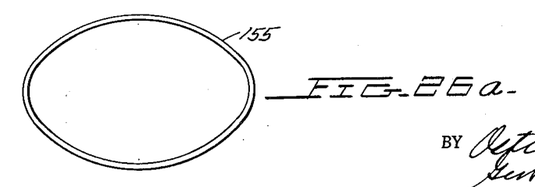

In this latter embodiment feed hopper 155 is of uniform transverse cross-section having an elliptical shape. However, hopper 155 is inclined at an angle such that a vertical section provides a circular exit 204. Similarly entrance 205, positioned in a horizontal plane, is also circular. Baffle plate assembly 156 is positioned adjacent to exit 204 and is rotatable by means to be hereinafter described.

Material 30, after passing through apertures in baffle plate assembly 156, flows through receiving hopper 162 comprising a truncated cone having its entrance end 164 larger than its exit end 163. Entrance 164 is vertically offset from exit 163 by an amount such that the lower wall 165 of receiving hopper 162 is inclined at 45° when conveyor tube 41 is level.

Figures 27, 28:
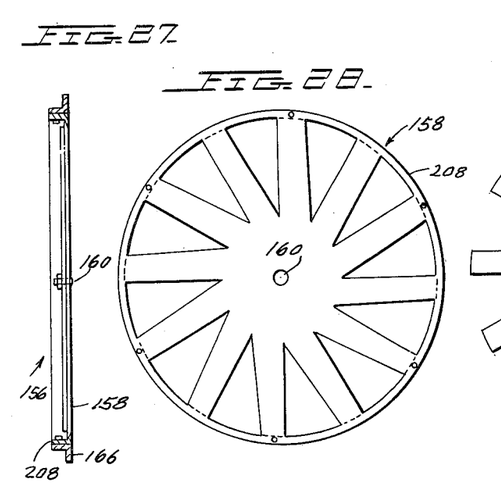
FIGURE 27 is a side elevation of an assembled rotatable baffle assembly.
FIGURES 28 and 29 are each views of the individual spoked members which comprise the baffle assembly of FIGURE 27.
Figure 29:
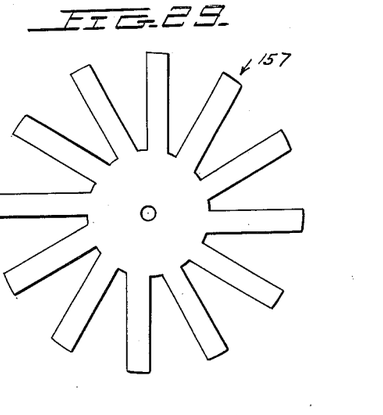

Baffle plate assembly 156 comprises two spoked plates 157 and 158 each having a plurality of apertures. Plate 157 is secured to plate 158 by central fastening means 160 which permits the angular position between plates 157, 158 to be selectively adjusted in order to permit a desired flow rate of a given material. With the spokes of both plates in alignment the apertures of the baffle plate assembly 156 are a maximum.

Baffle plate 158 includes a rolled over rim 208 secured to ring 166, formed from a piece of angle iron, which in turn is engaged by three grooved rollers 205—207 which journal the rotation of baffle plate assembly 156. The two bottom rollers 205, 206 are mounted on brackets 167, 168 respectively and the top roller 207 is mounted on cross brace 169 at the top of hanger brackets 170 which support receiving hopper 162. Cross braces 171 and screw means 172 secure receiving hopper 162 to brackets 170.

Ring 166 and baffle assembly 156 carried thereby are rotated by belt 173 driven by pulley 174 mounted on shaft 175 which is journaled in bearings 176, 177. Shaft 175 may be driven by the same motor 59 and shaft 178 which drive conveyor tube 41. The operative connection between shafts 175 and 178 is provided by gearing 211.

Non-tampering supply hopper 155 is mounted on an independent adjustable support (not shown) which enables the height and angle of inclination of hopper 155 to be adjusted to match that of cone shaped receiving hopper 162 and baffle assembly 156. Hopper 162 and baffle assembly 156 are both mounted to the same pivoted frame which carries conveyor tube 41.

The speed of rotation of baffle assembly 156 as well as the size of the apertures thereof may be set by trial to supply proper amounts of a given material to receiving hopper 162 and conveyor tube 41. The rotation of baffle plates 157, 158 serves to continuously break up any tendency of the material 30 to bridge at the junction between the supply 155 and receiving 162 hoppers.

Thus I have provided novel bulk conveyor means of the rotating conveyor tube type which achieves an increased uniform flow rate of material but utilizing one or more of the following features; (1) A rotatable receiving hopper, (2) A scraper means, and (3) A continuous belt guided to form a tube having a cross-section which resembles an inverted horse collar.

Although I have here described preferred embodiment of my novel invention, many variations and modifications will now be apparent to those skilled in the art, and I therefore prefer to be limited, not by the specific disclosure herein, but only by the appending claims.

I claim:

1. A bulk feeding apparatus comprising a generally vertically walled supply hopper, a receiving hopper, a rotatable conveyor tube; said receiving hopper comprising a generally rectangular entrance opening positioned in a substantially horizontal plane; a generally round exit opening positioned in a substantially vertical plane, and a curved elbow shaped chute between said entrance and said exit openings providing a gradual transition therebetween; said supply hopper having a lower opening entered into said entrance opening; said conveyor tube having a discharge opening at one end and an entrance opening at the other end through which said exit opening is entered; tilting means operatively connected to said conveyor tube for changing the angle of inclination of its longitudinal axis; said conveyor tube being pivoted about a horizontal axis disposed near said entrance opening of said conveyor tube.

2. A bulk feeding apparatus comprising a generally vertically walled supply hopper, a receiving hopper, a rotatable conveyor tube; said receiver hopper comprising a generally rectangular entrance opening, a generally round exit opening, and a curved elbow shaped chute between said entrance and said exit openings providing a gradual transition therebetween; said supply hopper having a lower opening entered into said entrance opening; said conveyor tube having a discharge opening at one end and an entrance opening at the other end through which said exit opening is entered; tilting means operatively connected to said conveyor tube for changing the angle of inclination of its longitudinal axis; said conveyor tube being pivoted about a horizontal axis disposed near said entrance opening; a scraper means comprising at least one blade having a working edge extending substantially parallel to the longitudinal axis of the tube for substantially the full length of the tube; a biasing means urging said working edge against the inner surface of said conveyor tube; said blade being pivotally secured at one end thereof to said receiving hopper and at the other end thereof to a member which is stationary while said conveyor tube is rotating and is tiltable in unison with said conveyor tube.

3. In a bulk feeding apparatus, a rotatable conveyor tube and a scraper means; said scraper means comprising a blade having a work edge extending substantially parallel to the longitudinal axis of the tube for substantially the full length of the tube; a biasing means urging said working edge against the inner surface of said conveyor tube; at least one support means engaging said blade at points intermediate the ends thereof means mounting said blade directly to said support means; said support means extending across a diameter of said conveyor tube.

4. In a bulk feeding apparatus, a rotatable conveyor tube and a scraper means; said scraper means comprising a blade having a working edge; a biasing means urging said working edge against the inner surface of said conveyor tube; at least one support means engaging said blade at points intermediate the ends thereof; said support means extending across a diameter of said conveyor tube; each of said support means comprising an elongated member having rollers connected to each of the ends thereof; said rollers being in engagement with the inner surface of said conveyor tube.

5. In a bulk feeding apparatus, a rotatable conveyor tube and a scraper means; said scraper means comprising a blade having a working edge; a biasing means urging said working edge against the inner surface of said conveyor tube; at least one support means engaging said blade at points intermediate the ends thereof; said support means extending across a diameter of said conveyor tube; each of said support means comprising an elongated member having rollers connected to each of the ends thereof; said rollers being in engagement with the inner surface of said conveyor tube; said blade having a convex surface and said elongated member having a complementary surface operatively positioned to engage said convex surface and support said blade; an opening in said blade communicating with said convex surface; a portion of said elongated member being entered through said opening in said blade.

6. A bulk feeding apparatus comprising a generally vertically walled supply hopper, a receiving hopper, a rotatable conveyor tube; said receiver hopper comprising a generally rectangular entrance opening; a generally round axit opening, and a curved elbow shaped chute between said entrance and said exit opening providing a gradual transition therebetween; said supply hopper having a lower opening entered into said entrance opening; said conveyor tube having a discharge opening at one end and an entrance opening at the other end through which said exit opening is entered; tilting means operatively connected to said conveyor tube for changing the angle of inclination of its longitudinal axis; said conveyor tube being pivoted about a horizontal axis disposed near said entrance opening; a scraper means comprising at least one blade having a working edge extending substantially parallel to the longitudinal axis of the tube for substantially the full length of the tube; a biasing means urging said working edge against the inner surface of said conveyor tube; said blade being pivotally secured at one end thereof to said receiving hopper and at the other end thereof to a member which is stationary while said conveyor tube is rotating and tiltable in unison with said conveyor tube; at least one support means engaging said blade at points intermediate the ends thereof means mounting said blade directly to said support means; said support means extending across a diameter of said conveyor tube.

References Cited in the file of this patent
UNITED STATES PATENTS

| | | |
|---|---|---|
| 389,456 | Gibson | Sept. 11, 1888 |
| 455,840 | Selby | July 14, 1891 |
| 640,263 | Bernhard | Jan. 2, 1900 |
| 847,862 | Warren | Mar. 19, 1907 |
| 1,235,157 | Peters | July 31, 1917 |
| 1,925,362 | Anstiss | Sept. 5, 1933 |
| 1,993,528 | Roser | Mar. 5, 1935 |
| 2,623,737 | McEachran | Dec. 30, 1952 |
| 2,764,392 | Fisher | Sept. 25, 1956 |